United States Patent
Hirsch et al.

(10) Patent No.: US 9,755,283 B2
(45) Date of Patent: Sep. 5, 2017

(54) HEATING AND COOLING DEVICE FOR A BATTERY

(71) Applicants: Mahle International GmbH, Stuttgart (DE); Behr France Rouffach SAS, Rouffach (FR)

(72) Inventors: Stefan Hirsch, Stuttgart (DE); Pascal Miss, Selestat (FR); Bernd Schaefer, Stuttgart (DE); Joachim Treier, Oppenau (DE); Stephane Weingaertner, Pfaffenheim (FR)

(73) Assignees: Mahle International GmbH (DE); Behr France Rouffach SAS (FR)

( * ) Notice: Subject to any disclaimer, the term of this patent is extended or adjusted under 35 U.S.C. 154(b) by 407 days.

(21) Appl. No.: 14/500,967

(22) Filed: Sep. 29, 2014

(65) Prior Publication Data

US 2015/0090426 A1    Apr. 2, 2015

(30) Foreign Application Priority Data

Sep. 30, 2013 (EP) .................................. 13186716

(51) Int. Cl.
  *H01M 10/613* (2014.01)
  *B60H 1/00* (2006.01)
  (Continued)

(52) U.S. Cl.
  CPC ...... *H01M 10/613* (2015.04); *B60H 1/00278* (2013.01); *B60L 1/006* (2013.01);
  (Continued)

(58) Field of Classification Search
  CPC ............. H01M 10/613; H01M 10/615; H01M 10/625; H01M 10/6556; H01M 10/6571;
  (Continued)

(56) References Cited

U.S. PATENT DOCUMENTS 4,591,692 A * 5/1986 Wightman .............. B60R 16/04
                                                       219/202
2013/0071716 A1* 3/2013 Frutschy .............. H05B 1/0286
                                                       429/120
(Continued)

FOREIGN PATENT DOCUMENTS

DE    102009058810 A1    6/2011
DE    102010038781 A1    2/2012
      (Continued)

OTHER PUBLICATIONS

English abstract for DE-102009058810.
(Continued)

*Primary Examiner* — Patrick Ryan
*Assistant Examiner* — Aaron Greso
(74) *Attorney, Agent, or Firm* — Fishman Stewart PLLC

(57) ABSTRACT

A heating and cooling device for a battery may include an electrically conductive base plate for thermal coupling to the battery. The base plate may include at least one fluid path for flowing through by a coolant. The device may include a carrier plate of an electrically non-conductive material, into which at least one electric heating element may be inserted. The carrier plate may be connected electrically with the electrically conductive base plate. An electrically conductive cover plate may be connected electrically with the electric heating element. The base plate, the carrier plate and the cover plate may be stacked on one another along a stacking direction.

20 Claims, 2 Drawing Sheets

(51) Int. Cl.
*H01M 10/625* (2014.01)
*H01M 10/615* (2014.01)
*H01M 10/6556* (2014.01)
*H01M 10/6571* (2014.01)
*F28F 3/12* (2006.01)
*B60L 1/00* (2006.01)
*B60L 11/18* (2006.01)
*F28D 1/053* (2006.01)

(52) U.S. Cl.
CPC ....... *B60L 11/1864* (2013.01); *B60L 11/1874* (2013.01); *B60L 11/1875* (2013.01); *B60L 11/1879* (2013.01); *F28F 3/12* (2013.01); *H01M 10/615* (2015.04); *H01M 10/625* (2015.04); *H01M 10/6556* (2015.04); *H01M 10/6571* (2015.04); *B60H 2001/00307* (2013.01); *B60L 2240/545* (2013.01); *F28D 1/05383* (2013.01); *Y02T 10/7011* (2013.01); *Y02T 10/7061* (2013.01)

(58) Field of Classification Search
CPC .. B60L 11/1864; B60L 1/006; B60L 11/1879; B60L 11/1874; B60L 2240/545; B60H 2001/00307; B60H 2001/1864; B60H 1/00278; F28D 1/05383; F28F 3/12; Y02T 10/7061; Y02T 10/7011
See application file for complete search history.

(56) References Cited

U.S. PATENT DOCUMENTS

2013/0172444 A1* 7/2013 Shin ................. C08K 13/02
523/223
2013/0207459 A1* 8/2013 Schroder ............ H01M 2/1077
307/10.1

FOREIGN PATENT DOCUMENTS

| | | |
|---|---|---|
| DE | 102011003296 A1 | 8/2012 |
| DE | 102011003535 A1 | 8/2012 |
| EP | 2388851 A1 | 11/2011 |
| JP | 2011-181224 * 9/2011 | ............ H01M 10/50 |

OTHER PUBLICATIONS

English abstract for DE-102010038781.
English abstract for DE-102011003296.
English abstract for EP-2388851.
English abstract for DE-102011003535.
EP Search Report EP13186716.0, dated Feb. 7, 2014.

* cited by examiner

HEATING AND COOLING DEVICE FOR A BATTERY

CROSS-REFERENCE TO RELATED APPLICATIONS

This application claims priority to European Patent Application No. EP 13186716.0, filed Sep. 30, 2013, the contents of which are hereby incorporated by reference in their entirety.

TECHNICAL FIELD

The present invention relates to a heating and cooling device for a battery and a battery arrangement with such a heating and cooling device. The invention further relates to a motor vehicle with such a battery arrangement.

BACKGROUND

Rechargeable battery systems for electric vehicles with purely electric drive and for hybrid vehicles and vehicles with fuel cell drive are the subject of current research. At present, in the said vehicle types, lithium-ion batteries are preferably used, which are distinguished by a high energy density and an only poorly marked, undesired memory effect. The capability of a rechargeable battery to reliably supply with electrical energy various electric consumers installed in motor vehicles depends to a considerable extent on the thermal conditions prevailing in the environment of the battery. This is because the electrochemical processes occurring in the battery both during the provision and also during the receiving of electrical energy—in the sense of recharging—, are dependent to a not insignificant extent on the operating temperature of the battery. Extensive investigations on various lithium-ion-based battery systems have shown, for instance, that below a critical temperature, for instance in the region of approx. 0° C., the electrical energy density provided by the battery decreases greatly compared with higher operating temperatures. Below the critical temperature, in addition damage to the lithium-ion cell can occur during charging.

Accordingly, the creation of thermally well-defined environmental conditions is crucial for a reliable and trouble-free operation of the said batteries—this applies not only for the said lithium-ion-based batteries, but generally for any rechargeable battery systems. This means, with regard to the considerable temperature fluctuations occurring for instance under normal operating conditions in a vehicle, that these must be balanced by suitable temperature control devices which are coupled thermally with the battery, in order to keep the ambient temperature of the battery, and therefore also the temperature of the battery itself, within a predetermined temperature interval. Such a device must be able, on the one hand, to increase the ambient temperature in the immediate environment of the battery, if this assumes a value which lies below the permissible temperature range. On the other hand, the possibility must also exist to lower the ambient temperature, if it exceeds the said temperature interval upwards.

Various devices which are able to be coupled thermally with a battery are known from the prior art, which generally comprise both a heating unit to increase the battery temperature and also a cooling system for lowering the battery temperature.

Thus, in DE 10 2009 90 588 19 A1 a device for heating and cooling a battery is described which has a coolant circuit and at least one electric heating element, which are both arranged in a shared heat transfer component. The electric heating element is connected here in a form- and/or force-fitting manner with the heat transmission component. It is characteristic for the device that it requires a relatively large number of components, which due to the construction are also heated by the heating element during a heating process, which distinctly increases the heating output necessary for the actually aimed for heating of the battery.

SUMMARY

The invention is therefore based on the problem of providing a heating and cooling device for a battery which is distinguished by effective thermal coupling with the battery which is to be heated or respectively cooled, and which at the same time is distinguished by a simple structural design with a small number of components. The invention has in addition the object of expanding a battery arrangement with a battery to be temperature-controlled by such a heating and cooling device. Finally, the invention has the object of indicating a motor vehicle with such a battery arrangement.

The said problems are solved according to the invention by the subject matter of the independent claims. Preferred embodiments are the subject matter of the dependent claims.

Accordingly, the basic idea of the invention is to construct a heating and cooling device for a battery in the manner of a plate with a base plate, a carrier plate and a cover plate, which are stacked on one another along a stacking direction. Both heating and cooling elements for heating or respectively cooling a battery, which is coupled thermally to the base plate, are provided between the base plate and the cover plate. Thus, the fluid path necessary for the coolant-supported cooling of the battery is provided for instance in the base plate itself, whereas the electric heating elements necessary for heating the battery are inserted into the carrier plate which is arranged in the manner of a sandwich between the base plate and cover plate. Such a structural approach allows the structural space required for the heating and cooling device according to the invention to be kept small compared with conventional heating and cooling devices.

The battery which is to be temperature-controlled can be brought to abut against a side of the base plate facing away from the carrier plate, and in this way is thermally coupled both to the base plate providing the fluid path and also to the electric heating element which is inserted into the carrier plate. The stack-type arrangement of the main components of the heating and cooling device, which are constructed in the manner of a plate, i.e. flat, enables here a highly efficient thermal connection of the battery which is to be temperature-controlled.

The respectively electrically conducting construction of base plate and cover plate is, moreover, essential to the invention, which enables a technically simple electrical connection of the electric heating elements with an external battery. A prerequisite for this is a structural design of the upper and lower side of the electric heating elements in that these are constructed at least in sections so as to be electrically conducting, so that these sections act as electrical external connections of the heating element. The cover or respectively base plate lying against the upper and lower side of the electric heating element in the mounted state of the heating and cooling device functions then in the manner of an electric connecting line between the electric heating element and the battery.

If the heating and cooling device according to the invention is used for the temperature control of a battery installed in the engine compartment of a motor vehicle, this—in contrast to the cover plate—does not necessarily have to be connected via a further electric connecting line with the said external energy supply unit, but rather can be earthed in a technically elegant manner directly via the vehicle body.

An embodiment proves to be particularly favourable with regard to installation space, in which at least one flat tube, forming the fluid path and extending at least partially along a longitudinal direction of the base plate, is provided on a first side of the base plate facing the carrier plate. The term "flat tube" comprises here in particular fluid lines of any type, the overall height of which is substantially less than their width. The height of typical flat tubes is at most a quarter, most preferably at most a tenth of their width. A flat tube constructed in such a manner enables a planar contact of the coolant flowing through the flat tube with the base plate, which has an advantageous effect on the interaction between coolant and battery, when the latter is applied on the side of the base plate facing away from the flat tube.

A particularly homogeneous cooling of the entire cooling plate can be achieved, however, by not only a single, but at least two, preferably four, flat tubes being provided on the cooling plate. These can be arranged at a distance from one another for instance with respect to a transverse direction of the base plate. Alternatively, however, adjacent flat tubes can also directly adjoin one another. In both cases, a planar and therefore particularly homogeneous cooling of the cooling plate with coolant can be achieved.

An embodiment in which the at least two flat tubes are formed respectively integrally on the base plate is particularly to be preferred in terms of production. Alternatively thereto, the flat tubes can also be fastened to the base plate by material connection, for instance by means of soldering or welding.

In order to now couple the electric heating element thermally as effectively as possible to the base plate and via the latter to the battery which is to be temperature-controlled, it is proposed according to a particularly preferred embodiment to provide at least two through-openings in the carrier plate, into which respectively an electric heating element is inserted, and namely preferably such that the heating elements fill the through-openings as completely as possible with respect to a top view onto the carrier plate. The fixing of the electric heating elements in the through-openings can take place with the aid of an adhesive connection. On the opening edge, bordering a respective through-opening, in addition one or more projections can be provided protruding inwards into the through-opening, which act as a stop on insertion of an electric heating element into an opening and which are able, to a not insignificant extent, to facilitate the insertion process for an operator.

It is clear that the base plate, coupled thermally to the carrier plate, can undergo a particularly homogeneous lateral heating, when not only a single electric heating element, but rather a plurality of electric heating elements is provided in the carrier plate. Experimental investigations have now shown that the provision of at least four, preferably 15, most preferably 20, through-openings, into which respectively electric heating elements are inserted, constitutes an optimum compromise with regard to the homogeneous heating able to be achieved in the base plate in relation to the structural effort necessary to realize this.

In a particularly preferred embodiment, the through-openings of the carrier plate in a mounted state of the heating and cooling device are arranged respectively in regions between two adjacent flat tubes.

A particularly homogeneous, lateral heating of the base plate can be achieved, however, by the at least four heating elements which are arranged with respect to a top view onto the carrier plate in the manner of a grid on the latter.

Electric heating elements, constructed in the manner of a plate, which have a substantially rectangular shape with respect to a top view, are able to be produced with particularly little effort from the point of view of manufacturing technique. Consequently, it is useful to also provide the through-openings with the geometric shape of a rectangle with respect to a top view onto the carrier plate.

The installation space necessary for the base plate and the carrier plate in stacking direction can be additionally reduced to a not insignificant extent by a side of the carrier plate facing the base plate being provided with a surface contour which is constructed in a substantially complementary manner to the surface contour of a side of the base plate facing the carrier plate.

Particularly expediently, the carrier plate comprises a carrier material of plastic. In this way, it is ensured that no undesired electric short-circuit currents flow between the electrically conducting base plate and the likewise electrically conducting cover plate—both plates can function as electric conducting elements for the electric heating elements, which conducting elements are connected to an external battery for the electrical energy supply of the heating elements—, if the two plates are connected with the two electric poles of the battery.

For the introduction of coolant into the fluid path of the base plate, it is recommended to provide a shared coolant inlet on the base plate on a first end section with respect to the longitudinal direction thereof, which extends along the transverse direction of the base plate and is fluidically connected with the flat tubes. Accordingly, it is useful, for the directing of the coolant out from the base plate, to provide a shared coolant outlet on a second end section with respect to the longitudinal direction, which extends along the transverse direction of the base plate and is likewise fluidically connected with the flat tubes. In other words, in the configuration which is proposed here, the introduction of coolant into the fluid path provided in the base plate takes place in a first end section of the base plate with respect to its longitudinal direction. The coolant flows through the base plate in the fluid path, formed by flat tubes, along the longitudinal direction, and emerges again from the base plate in the region of a second end section lying opposite the first end section.

Particularly expediently, the said shared coolant inlet and coolant outlet can be constructed in the manner of a flat tube, which extends in the first or respectively second end section along the transverse direction of the base plate. For the case where the fluid path is formed by one or more flat tubes extending along the longitudinal direction of the base plate, coolant can be introduced firstly into the shared fluid inlet for instance through an inlet opening in the form of a pipe connection projecting from the base plate, and can subsequently be distributed to the flat tubes forming the fluid path. The same applies mutatis mutandis for the shared fluid outlet and an outlet opening provided thereon.

However, a variant is to be preferred as regards manufacturing technique, in which the coolant inlet and/or the coolant outlet are connected with the base plate in a materially connected manner, in particular by means of a welded or soldered connection.

In a preferred embodiment, PTC heating elements constructed in the manner of a plate, which are familiar to the relevant specialist in the art, can be used as electric heating elements. The plate-like shape of such heating elements, which are available commercially in large quantities, allows these to be used in the heating and cooling device according to the invention without major structural modifications. Such PTC elements typically have a length of approximately 35 mm, a width of between 4 mm and 14 mm and a height of up to 2 mm.

The invention further relates to a battery arrangement for a motor vehicle with a battery, in particular a lithium-ion battery, and with a heating and cooling device coupled thermally with the battery, having one or more of the previously mentioned features. The thermal coupling can be realized here by a fastening of the battery to the heating and cooling device for instance in the region of the base plate. A fastening in the region of the cover plate or laterally on the heating and cooling device is also conceivable.

A variant proves to be particularly elegant here from a technical point of view, in which the battery which is to be heated or respectively cooled by means of the heating and cooling device is used at the same time as an energy supply unit for supplying the electric heating elements of the heating and cooling device with electrical energy.

The invention finally relates to a motor vehicle with a previously presented battery arrangement.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
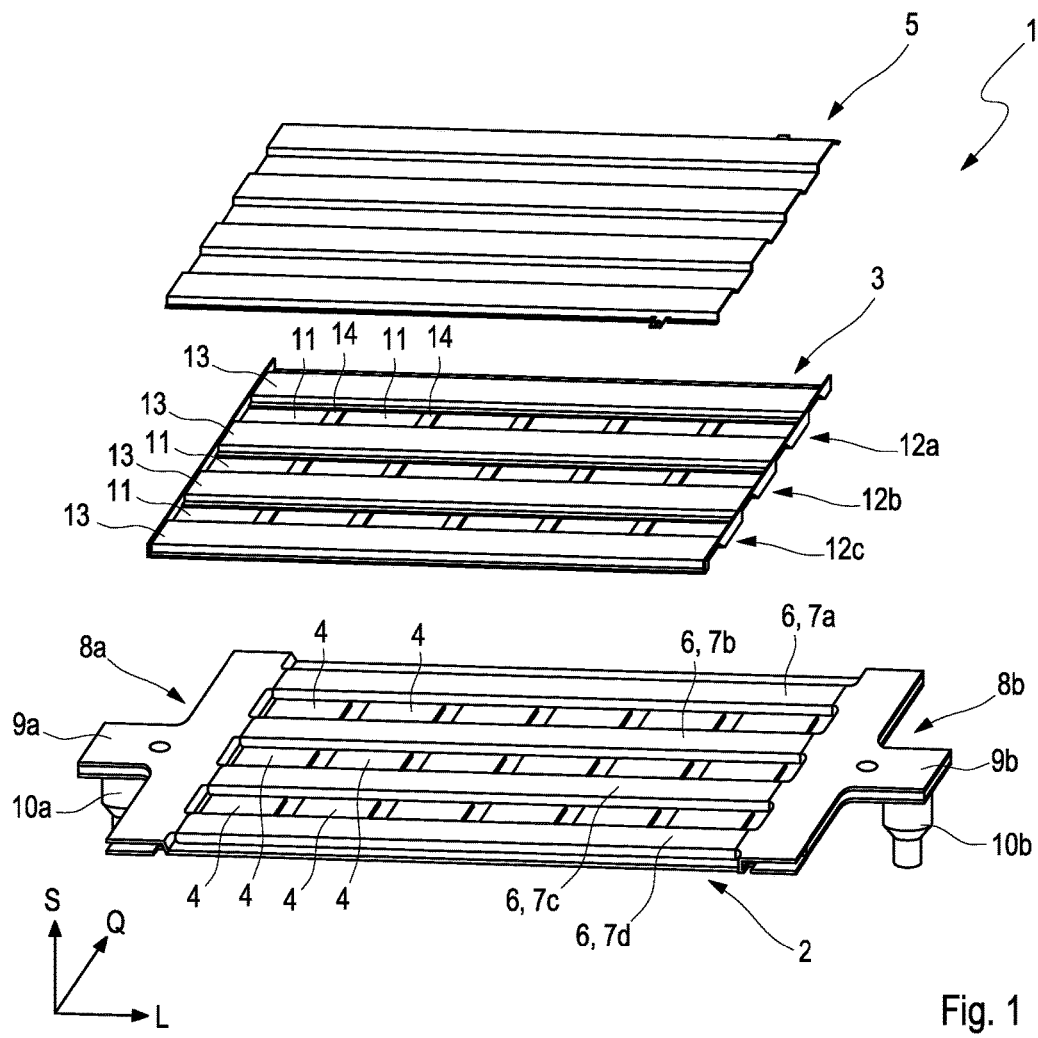
FIG. 1 an example of a heating and cooling device according to the invention, in an exploded illustration, FIG. 2 a cut-out of the heating and cooling device of FIG. 1 in a mounted state in a longitudinal section, FIG. 3 the carrier plate of the heating and cooling device and the heating elements thereof in an exploded illustration, FIG. 4 the heating and cooling device of FIG. 1 in a mounted state in a perspective illustration.
Figure 3:
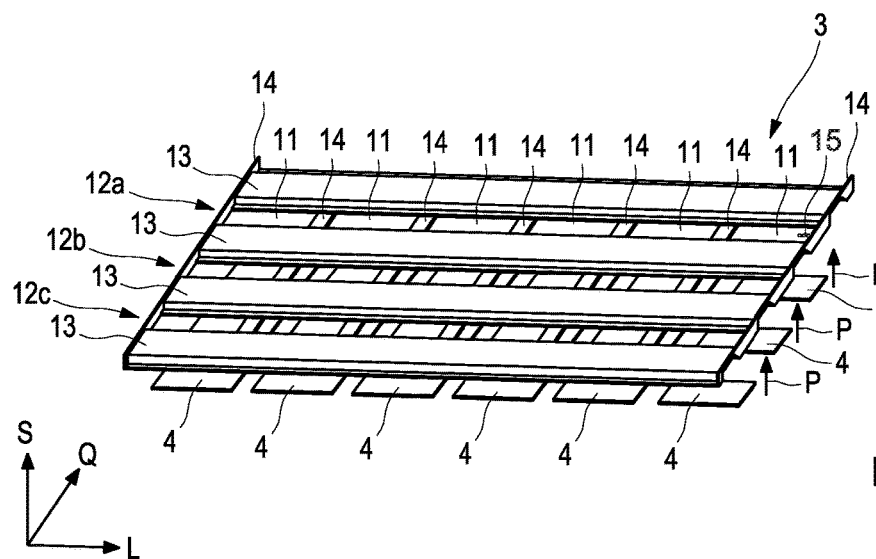

FIG. 1 illustrates an example of a heating and cooling device 1 according to the invention in an exploded illustration. The heating and cooling device 1 comprises an electrically conductive base plate 2, to which a battery which is to be temperature-controlled can be coupled thermally by mechanical contact. The heating and cooling device 1 further comprises a carrier plate 3 of an electrically non-conducting material, which serves to receive several electric heating elements 4. In FIG. 1, for the sake of clarity, the electric heating elements 4 are not shown in a received state in the carrier plate 3, but rather in their final mounting position—after the assembly of the heating and cooling device 1—on the base plate 2. By comparison, FIG. 3 shows the carrier plate 3 with the electric heating elements 4 to be received by it, in an exploded illustration.

Looking again now at FIG. 1, it will be seen that the heating and cooling device 1 also comprises an electrically conductive cover plate 5. In a mounted state of the heating and cooling device, the base plate 2, the carrier plate 3 and the cover plate 5 are stacked on one another along a stacking direction S. For the purpose of optimizing the installation space along the stacking direction S, the side of the carrier plate 3 facing the base plate 2 has a surface contour which is constructed substantially in a complementary manner to that of the side of the base plate 2 facing the carrier plate 3.

A fluid path 6 is provided in the base plate 2, through which a coolant or refrigerant—hereinafter designated exclusively as "coolant" for the sake of simplicity—can flow, so that by thermal interaction of the coolant with the battery which is to be temperature-controlled, the latter is cooled. Water-glycol may be used for instance as coolant, substances available as refrigerants in the specialist trade under the name "134a", "R1234yf", or "R744".

In the example scenario of FIG. 1, the fluid path 6 consists of four flat tubes 7a, 7b, 7c, 7d, which extend along the longitudinal direction L of the base plate substantially parallel to one another and along the transverse direction Q of the base plate 2 at a distance from one another on a side of the base plate 2 facing the carrier plate 3. It is clear that in modifications of the example of FIG. 1, a different number of flat tubes 7a-7d can be provided. In the example scenario of FIG. 1, the flat tubes 7a-7d are formed respectively integrally on the base plate 2. Alternatively thereto, however, the flat tubes 7a-7d can also be firstly manufactured separately and then fastened in a materially connected manner to the base plate 2, for instance by means of soldering or welding.

The term "flat tube" comprises here in particular fluid lines, the height of which is at most a quarter, most preferably at most a tenth of their width. Flat tubes 7a-7d constructed in such a manner enable a planar contact of the coolant, flowing through the flat tube 7a-7d, with the base plate 2, which has an advantageous effect on the thermal interaction between coolant and battery, when the latter is applied on a side of the base plate 2 facing away from the flat tubes 7a-7d.

The arrangement of the individual flat tubes 7a-7d with respect to the transverse direction Q at a distance from one another permits the intermediate space to be provided between two adjacent flat tubes to receive the electric heating elements 4, which can be seen directly from the illustration of FIG. 1. Such an arrangement of electric heating elements 4 and flat tubes 7a-7d makes it possible to distribute both components uniformly on the base plate 2, which promotes a homogeneous temperature control of the base plate 2 and therefore also of the battery which is thermally coupled to the base plate 2.

For the introduction of coolant into the fluid path 6 of the base plate 2, a shared coolant inlet 9a is provided on the base plate 2 on a first end section 8a with respect to the longitudinal direction L thereof of the base plate 2, which coolant inlet extends along the transverse direction Q of the base plate 2 and therefore extends the latter contrary to the longitudinal direction L. As shown in FIG. 1, the coolant inlet 9a can also be constructed in the manner of a flat tube and can have a pipe connection 10a, projecting from the base plate 2, for the introduction of coolant into the coolant inlet 9a. The coolant is distributed to the individual flat tubes 7a-7d via the coolant inlet 9a. In other words, the pipe connection 10a communicates fluidically with the flat tubes 7a-7d of the fluid path 6 via the coolant inlet 9a.

The same now also applies to the directing of coolant out from the flat tubes 7a-7d of the fluid path 6: For this purpose, a shared coolant outlet 9b is provided on the base plate 2 on a second end section 8b with respect to the longitudinal direction L thereof, which lies opposite the first end section 8a, which coolant outlet extends in an analogous manner to the coolant inlet 9a likewise along the transverse direction Q of the base plate 2 and therefore extends the latter in longitudinal direction L. The coolant outlet 9b is also constructed in FIG. 1 in the manner of a flat tube and has a pipe connection 10b, projecting from the base plate 2, for directing the coolant out from the coolant outlet 9b.

The coolant flows through the base plate 2 therefore in the fluid path 6 formed by the flat tubes 7a-7d along the longitudinal direction L of the base plate 2 and emerges from the latter again in a second end section 8b of the base plate 2 lying opposite the first end section 8a. Both the shared coolant inlet 9a and the shared coolant outlet 9b can be secured to the base plate 2 in a materially connected manner, for instance by means of a welded or soldered connection.

FIG. 3 shows, as already mentioned, the carrier plate 3 with the electric heating elements 4 which are able to be inserted therein, in an exploded illustration. Eighteen through-openings 11 are provided in the carrier plate 3, which are arranged in the manner of a grid—in the example scenario of FIG. 3 with three grid rows 12a, 12b, 12c. Of course, in variants a different number of through-openings 11 is also possible. In the example scenario, the through-openings 11 have substantially the geometric shape of a rectangle with respect to a top view onto the carrier plate.

The carrier plate 3 with the through-openings 11 can be realized by a corresponding number of longitudinal struts 13 arranged along the longitudinal direction L, which in turn are connected with one another by transverse struts arranged along the transverse direction Q, i.e. orthogonally to the longitudinal direction L.

In the example of FIGS. 1 and 3, four longitudinal struts 13 and seven transverse struts 14 are necessary, in order to provide the desired eighteen through-openings.

In the course of the assembly of the heating and cooling device 1, eighteen electric heating elements 4 are inserted accordingly into the eighteen through-openings 11, which electric heating elements, after such an insertion (cf. arrows P in FIG. 3) are consequently likewise arranged in the manner of a grid with three grid rows in the carrier plate 3.

The fixing of the electric heating elements 4 in the through-openings 11 can take place by means of a materially connected connection, for instance using an adhesive. At the opening edge bordering a respective through-opening 11, one or more projections 15 (cf. FIG. 3) can be provided protruding inwards into the through-opening, which act as a stop on insertion of a respective electric heating element 4 into a through-opening 11.

Accordingly, the electric heating elements 4, constructed in the manner of a plate, also have a substantially rectangular shape in top view, which is able to be produced particularly simply in terms of manufacturing technique and therefore at a favourable cost.

The carrier plate 3 with the electric heating elements 4 is arranged for assembly of the heating and cooling device 1 on the base plate 2. By a mounting of the cover plate 5 on the carrier plate 3, the base plate 2 and the carrier plate 3 are completed to form the heating and cooling device 1.

Figure 2:
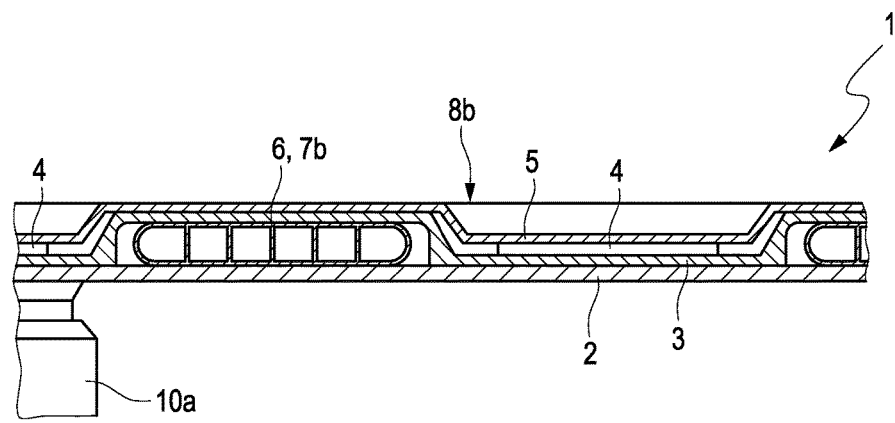
Figure 4:
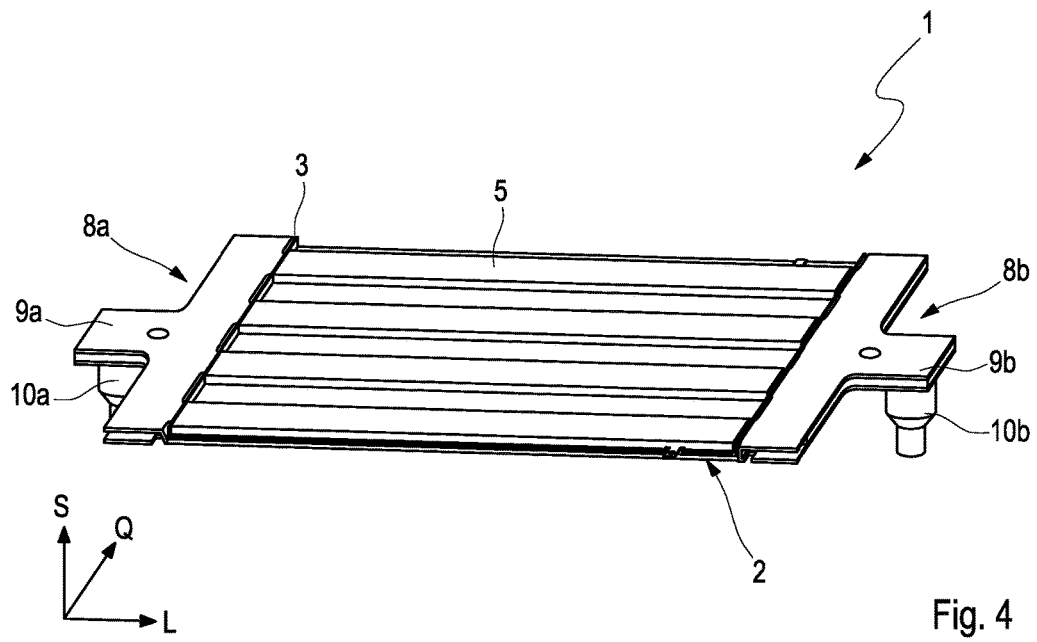

The finished mounted heating and cooling device is shown in a perspective view in FIG. 4 and in a longitudinal section in FIG. 2.

The installation space necessary in stacking direction for the base plate 2 and the carrier plate 3 can be reduced once more to a not insignificant extent by a side of the carrier plate 3 facing the base plate 2 being provided with a surface contour which is constructed in a substantially complementary manner to the surface contour of a side of the base plate 2 facing the carrier plate 3.

The carrier plate 3 has in addition a carrier material of a plastic. In this way, it is ensured that no electric short-circuit currents can flow between the electrically conducting base plate 2 and the likewise electrically conducting cover plate 5—both plates 2, 3 function for the electric heating elements 4 as electric conducting elements which can be connected to an external battery (not shown) for the shared electrical energy supply of the eighteen electric heating elements 4—, when the two plates 2, 5 are connected with the two electric poles of the battery.

Through a corresponding configuration of the electrically conducting cover plate 5, it is possible to control individual or several electric heating elements 4 separately, whereby a particularly variable adjustment of the heating capacity provided by the electric heating elements 4 can be realized.

PTC elements constructed in the manner of a plate are used as electric heating elements 4. The plate-like shape of such PTC heating elements, which are available commercially in large quantities, allows these to be used in the heating and cooling device 1 according to the invention without major structural modifications. Such PTC heating elements typically have a length of approx. 35 mm, a width of between 4 mm and 14 mm and a height of up to 2 mm. The PTC heating elements which are used have the advantage that their electric resistance rises with increasing temperature, whereby in turn the heating capacity generated by them decreases, i.e. the PTC heating elements operate in a self-regulating manner. Therefore, no separate sensor system is necessary, which switches off the electric heating elements on exceeding a maximum permitted critical temperature above which potentially the risk would exist of damage to the battery which is to be temperature-controlled.

The invention claimed is:

1. A heating and cooling device for a battery, comprising:
an electrically conductive base plate for thermal coupling to the battery, wherein at least one fluid path is provided in the base plate for flowing through by a coolant;
a carrier plate of an electrically non-conducting material and at least one electric heating element inserted into the carrier plate, the carrier plate connected electrically with the electrically conductive base plate;
an electrically conductive cover plate, the cover plate connected electrically with the at least one electric heating element; and
wherein the base plate, the carrier plate and the cover plate are arranged stacked one on top of the other along a stacking direction, and wherein the carrier plate is arranged between the base plate and the cover plate in the stacking direction.

2. The heating and cooling device according to claim 1, wherein the at least one fluid path includes at least one flat tube extending at least partially along a longitudinal direction of the base plate, the at least one flat tube provided on a first side of the base plate facing towards the carrier plate in the stacking direction.

3. The heating and cooling device according to claim 2, wherein the at least one flat tube includes at least two flat tubes arranged spaced apart from one another with respect to a transverse direction of the base plate.

4. The heating and cooling device according to claim 2, wherein the at least one flat tube is at least one of formed integrally on the base plate and connected with the base plate in a materially connected manner.

5. The heating and cooling device according to claim 1, further comprising at least two through-openings provided in the carrier plate, the at least two through-openings respectively receiving an electric heating element.

6. The heating and cooling device according to claim 1, wherein the at least one electric heating element includes a plurality of electric heating elements and the carrier plate defines a plurality of through-openings each receiving a respective one of the plurality of electric heating elements, and wherein at least one electric heating element of the plurality of electric heating elements disposed in the carrier plate is in contact with the base plate on a first side and with the cover plate on a second side opposite the first side with respect to the stacking direction.

7. The heating and cooling device according to claim 5, wherein the at least two through-openings of the carrier plate are arranged respectively in regions between two adjacent flat tubes in a mounted state.

8. The heating and cooling device according to claim 1, wherein the carrier plate includes a plurality of longitudinal struts and a plurality of lateral struts defining a grid arrangement with respect to an elevated view along the stacking direction onto the carrier plate, and wherein the at least one electric heating element is disposed in a through-opening defined by the grid arrangement.

9. The heating and cooling device according to claim 8, wherein the grid arrangement defines a plurality of through-openings having substantially a geometric shape of a rectangle with respect to the elevated view along the stacking direction onto the carrier plate.

10. The heating and cooling device according to claim 1, wherein a side of the carrier plate facing the base plate has a surface contour which is substantially complementary to a surface contour of a side of the base plate facing the carrier plate.

11. The heating and cooling device according to claim 1, wherein the carrier plate comprises a carrier material of plastic.

12. The heating and cooling device according to claim 3, wherein the base plate includes:
a shared coolant inlet on a first end section with respect to the longitudinal direction thereof, which coolant inlet extends along the transverse direction of the base plate and is fluidically connected with the flat tubes, and
a shared coolant outlet on a second end section with respect to the longitudinal direction thereof, which coolant outlet extends along the transverse direction of the base plate and is fluidically connected with the flat tubes.

13. The heating and cooling device according to claim 12, wherein at least one of the shared coolant inlet and the shared coolant outlet is connected with the base plate in a materially connected manner.

14. The heating and cooling device according to claim 1, wherein the at least one electric heating element is constructed as a plate-like PTC heating element.

15. A battery arrangement for a motor vehicle, comprising:
a battery; and
a heating and cooling device thermally coupled to the battery, the heating and cooling device including:
an electrically conductive base plate coupled to the battery, the base plate including at least one fluid path for flow of a coolant;
a carrier plate of an electrically non-conductive material and configured to receive at least one heating element, the carrier plate electrically connected with the electrically conductive base plate;
an electrically conductive cover plate connected electrically with the at least one electric heating element;
wherein the base plate, the carrier plate and the cover plate are arranged stacked one on top of the other along a stacking direction, and wherein the carrier plate is sandwiched between the base plate and the cover plate in the stacking direction.

16. A motor vehicle, comprising:
at least one battery arrangement including a battery thermally coupled to a heating and cooling device, the heating and cooling device including:
an electrically conductive base plate connected to the battery, the base plate including at least one fluid path for flow of a coolant, wherein the at least one fluid path includes at least two flat tubes arranged spaced apart from one another relative to a transverse direction of the base plate, the at least two flat tubes extending at least partially along a longitudinal direction of the base plate;
a carrier plate of an electrically non-conductive material connected electrically with the base plate, the carrier plate including at least two through-openings;
at least two electric heating elements disposed in the at least two through-openings of the carrier plate;
an electrically conductive cover plate connected electrically with the at least two electric heating elements;
wherein the base plate, the carrier plate and the cover plate are arranged stacked one on top of the other along a stacking direction, and the carrier plate is sandwiched between the base plate and the cover plate in the stacking direction; and
wherein the cover plate lies against a first side of the at least two electric heating elements and the base plate lies against a second side of the at least two electric heating elements opposite the first side with respect to the stacking direction.

17. The vehicle according to claim 16, wherein the carrier plate includes a plurality of longitudinal struts arranged along the longitudinal direction and a plurality of transverse struts arranged along the transverse direction, the plurality of longitudinal struts and the plurality of transverse struts together defining a plurality of through-openings arranged in a grid, and wherein the at least two electric heating elements are disposed in a respective one of the plurality of through-openings.

18. The battery arrangement according to claim 15, wherein the carrier plate includes a plurality of longitudinal struts and a plurality of transverse struts, the plurality of longitudinal struts and the plurality of transverse struts together defining a plurality of through-openings arranged in a grid, and wherein the at least one electric heating element includes a plurality of electric heating elements disposed in the plurality of through-openings.

19. The battery arrangement according to claim 15, wherein the carrier plate defines at least one through-opening and the at least one electric heating element is disposed in the at least one through-opening, and wherein the cover plate lies against a first side of the at least one electric heating element and the base plate lies against a second side of the at least one electric heating element opposite the first side to define a respective electric connection between the cover plate and the first side of the at least one electric heating element and between the base plate and the second side of at least one electric heating element.

20. The heating and cooling device according to claim 1, wherein the carrier plate defines a plurality of through-openings for receiving a plurality of electric heating elements, and wherein the carrier plate further includes at least one projection disposed at an edge bordering at least one through-opening of the plurality of through-openings, the at least one projection protruding inwards from the edge into the at least one through-opening to provide a stop for a respective electric heating element.

* * * * *